(12) United States Patent
Alley (10) Patent No.: US 11,198,324 B2
(45) Date of Patent: Dec. 14, 2021

(54) WHEEL HUB ASSEMBLY (71) Applicant: Profile Racing, Inc., St. Petersburg, FL (US)

(72) Inventor: Corey Alley, Maderia Beach, FL (US)

(73) Assignee: Profile Racing, Inc., St. Petersburg, FL (US)

( * ) Notice: Subject to any disclaimer, the term of this patent is extended or adjusted under 35 U.S.C. 154(b) by 507 days.

(21) Appl. No.: 16/254,655

(22) Filed: Jan. 23, 2019

(65) Prior Publication Data
US 2020/0231002 A1 Jul. 23, 2020

(51) Int. Cl.
| | |
|---|---|
| *B60B 27/02* | (2006.01) |
| *B60B 1/04* | (2006.01) |
| *B60B 27/00* | (2006.01) |
| *F16C 21/00* | (2006.01) |
| *B60B 1/00* | (2006.01) |

(52) U.S. Cl.
CPC ............ *B60B 27/023* (2013.01); *B60B 1/042* (2013.01); *B60B 27/0078* (2013.01); *F16C 21/005* (2013.01); *B60B 1/003* (2013.01); *B60B 27/0005* (2013.01); *B60B 2380/12* (2013.01); *B60B 2380/71* (2013.01); *F16C 2326/02* (2013.01)

(58) Field of Classification Search
CPC ... B60B 27/023; B60B 27/0078; B60B 1/042; F16C 21/005; F16C 2326/02
See application file for complete search history.

(56) References Cited

U.S. PATENT DOCUMENTS

| | | | |
|---|---|---|---|
| 373,807 | A * | 11/1887 | King ..................... B60B 27/023 |
| | | | 384/545 |
| 929,762 | A | 8/1909 | Hess |
| 2,147,787 | A | 2/1939 | Ferguson |
| 3,806,214 | A | 4/1974 | Keiser |
| 3,816,013 | A | 6/1974 | Schuhmann |
| 4,054,999 | A | 10/1977 | Harbottle |
| 5,456,537 | A * | 10/1995 | Wang ..................... B60B 27/023 |
| | | | 384/545 |
| 5,549,396 | A | 8/1996 | Chiang |
| 5,997,104 | A * | 12/1999 | Campagnolo ....... B60B 27/0005 |
| | | | 301/110.5 |
| 6,139,192 | A | 10/2000 | Chiang |
| 6,149,244 | A | 11/2000 | Wagner |
| 6,244,750 | B1 | 6/2001 | Chiang |
| 6,386,643 | B1 | 5/2002 | Marzocchi et al. |
| 6,588,564 | B1 | 7/2003 | Jager et al. |
| 6,783,192 | B2 * | 8/2004 | Meggiolan .............. B60B 1/041 |
| | | | 192/64 |
| 7,059,686 | B2 | 6/2006 | Kanehisa |
| 7,360,952 | B2 * | 4/2008 | Kanehisa ............ B60B 27/0005 |
| | | | 384/545 |
| 7,481,499 | B2 | 1/2009 | Meggiolan |
| 7,731,428 | B2 | 6/2010 | Kuan |
| 8,162,344 | B2 * | 4/2012 | Hoogendoorn ......... B60B 27/04 |
| | | | 280/284 |

(Continued)

*Primary Examiner* — Scott A Browne
(74) *Attorney, Agent, or Firm* — Lewellyn Law, PLLC; Stephen Lewellyn (57) ABSTRACT

A wheel hub assembly for tension spoke wheels is provided. The wheel hub assembly has a construction that automatically adjusts the position of the axle bearings along the rotational axis of the hub assembly to take-up slack between the axle bearings and the hub shell to prevent wheel wobble.

13 Claims, 6 Drawing Sheets

(56) References Cited

U.S. PATENT DOCUMENTS

| | | |
|---|---|---|
| 8,590,657 B2 | 11/2013 | Webster et al. |
| 8,721,187 B2 | 5/2014 | Yamanaka |
| 8,967,371 B2 | 3/2015 | Dunn |
| 8,979,387 B2 | 3/2015 | Mouri et al. |
| 9,085,197 B2 | 7/2015 | Fujita |
| 2007/0252427 A1* | 11/2007 | Kanehisa .............. B60B 27/047 301/110.5 |
| 2016/0236511 A1 | 8/2016 | Fakhoury et al. |
| 2018/0141376 A1 | 5/2018 | Lemen et al. |

* cited by examiner

WHEEL HUB ASSEMBLY

FIELD OF THE INVENTION

The present invention relates generally to bicycles, and more particularly, relating to a wheel hub for tension spoke wheels.

BACKGROUND OF THE INVENTION

Conventionally, tension spoke wheels having a hub assembly, a rim, a plurality of spokes that connect the hub assembly and rim, and a tire mounted to the rim. The hub comprises a hub shell rotatably supported on an axle by bearings that are located at opposite ends of the hub shell. The bearings are fitted within the hub bore at the opposite ends of the hub shell. The hub bore is dimensioned to provide tight tolerances with the bearings to prevent wheel wobble when turning on the axle. Because of the tight tolerances, the bearings are usually pressed into the hub bore by a wheel bearing press and removed by a wheel bearing puller.

Each end of the hub shell is provided with a flange that is used to engage the spokes. Through holes that are used to engage the spokes are made in these flanges in the hub axel direction at spaced distance from each other in the circumferential direction. One end of each spoke is attached to the hub shell by passing through one of the holes formed through flanges. The opposite end of each spoke is attached to the rim by a tensioning device, typically called a nipple that is threaded into the rim. The spokes are tensioned to ensure rigidity of the wheel.

Over tensioning the spokes is a common problem, which can cause the hub shell to deform, resulting in an expansion of the hub bore near the opposite ends of the hub shell where the bearings are seated. This deformation increases the seat tolerance between the bearings and the hub bore, which causes undesirable wheel wobble. If the deformation becomes too great, the hub shell must be replaced.

SUMMARY OF THE INVENTION

In view of the foregoing described and other inherent disadvantages in known wheel hub assemblies present in the prior art, embodiments of the invention provide a new wheel hub assembly that automatically adjusts its axle bearings to account for slack between the bearings and the hub shell to prevent wheel wobble.

Another object of embodiments of the invention is to provide a wheel hub assembly that is easier to service by not requiring a bearing press and a bearing puller for removing axle bearings from the hub shell.

Another object of embodiments of the invention is to provide a wheel hub assembly that prevents overtightening axle bearings.

Another object of embodiments of the invention is to provide a wheel hub assembly wherein the axle bearings are angular contact bearings, as opposed radial bearings that are currently used in wheel hub assemblies.

In general, in one aspect, a wheel hub assembly is provided the includes a hub shell having opposite first and second ends, a through bore extending through the first and second ends, and first and second flanges extending radially from the axis of the hub shell for interconnecting the hub shell to a plurality of spokes. The through bore, at opposite ends thereof, being tapered from wide to narrow in an inward direction along the axis of the hub shell. First and second bearing cups, each having opposite first and second sides, a frustoconical-shaped body extending between the first and second sides, a bearing seat bore formed through the first side, and an axle bore formed through the second side and connecting with the bearing seat bore. The frustoconical-shaped body tapering from wide to narrow in a direction from side first side to the second side, wherein the taper of the frustoconical-shaped body corresponds to the taper of the through bore at one of the opposite ends of the through bore such that the frustoconical-shaped body is disposed within the through bore at the respective end thereof and is movable in a direction along the axis. A first bearing removably seated within the bearing seat bore of the first bearing cup and a second bearing removably seated within the bearing seat bore of the second bearing cup. And an axle extending along the axis of the hub shell and through and rotatably engaged with the first and second bearings.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

For a better understanding of the invention, its operating advantages and the specific objects attained by its uses, reference should be had to the accompanying drawings and descriptive matter in which there are illustrated embodiments of the invention.

BRIEF DESCRIPTION OF THE DRAWINGS

The following drawings illustrate by way of example and are included to provide further understanding of the invention for the purpose of illustrative discussion of the embodiments of the invention. No attempt is made to show structural details of the embodiments in more detail than is necessary for a fundamental understanding of the invention, the description taken with the drawings making apparent to those skilled in the art how the several forms of the invention may be embodied in practice. Identical reference numerals do not necessarily indicate an identical structure. Rather, the same reference numeral may be used to indicate a similar feature of a feature with similar functionality. In the drawings.

DETAILED DESCRIPTION OF THE INVENTION

With reference first to FIGS. 1 through 5, there is representatively illustrated a wheel hub assembly 10a according to an embodiment of the invention. Wheel hub assembly 10a is representatively shown as a front hub assembly for a bicycle wheel. Wheel hub assembly 10a includes a hub shell 12, bearing cups 14 and 16, bearings 18 and 20, axle 22, wave springs 24 and 26, washers 28 and 30, and retaining rings 32 and 34.

Figure 1:
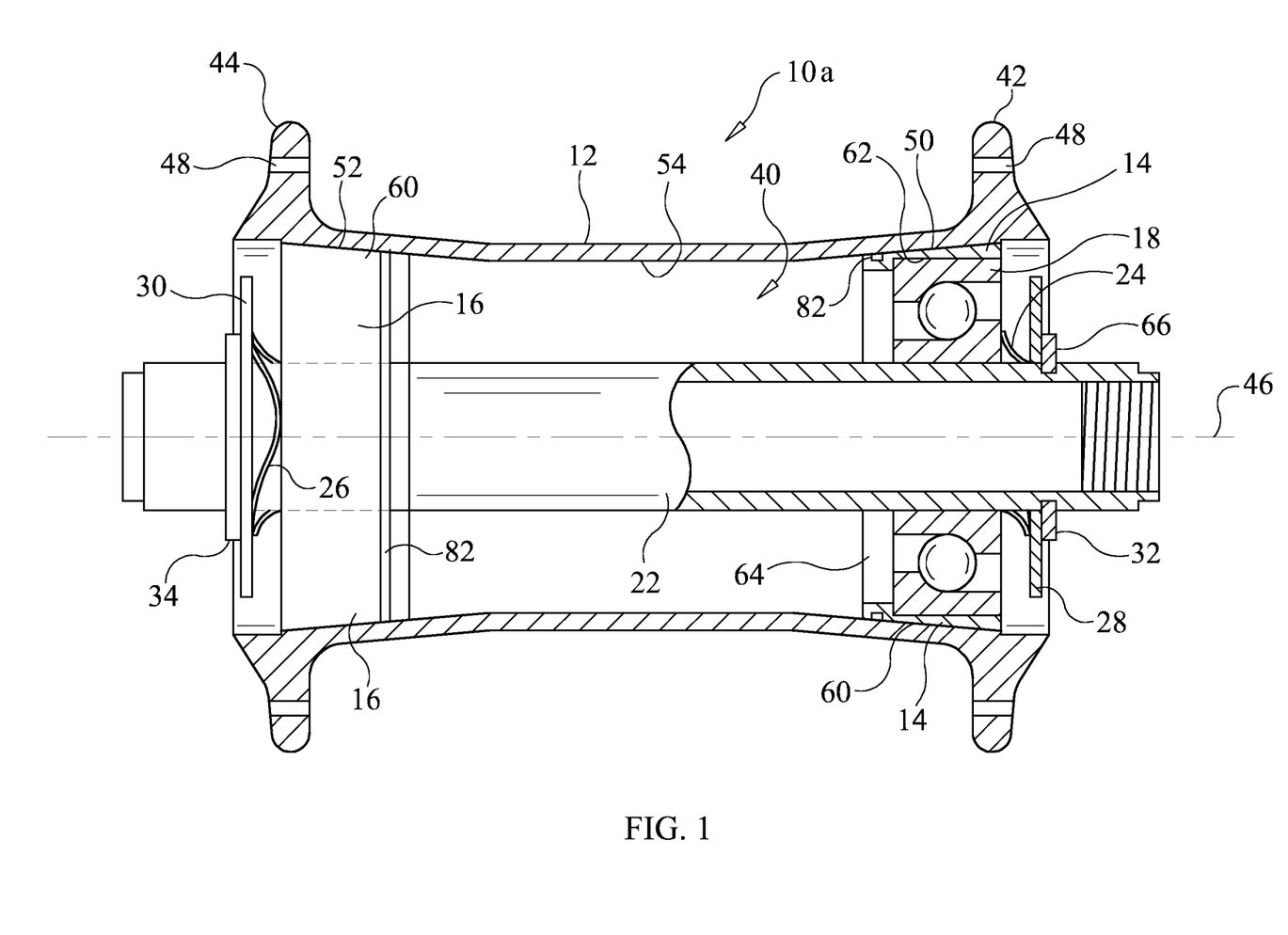
FIG. 1 is a diagrammatic cross-sectional view of a wheel hub assembly constructed in accordance with an embodiment of the invention.
Figure 2:
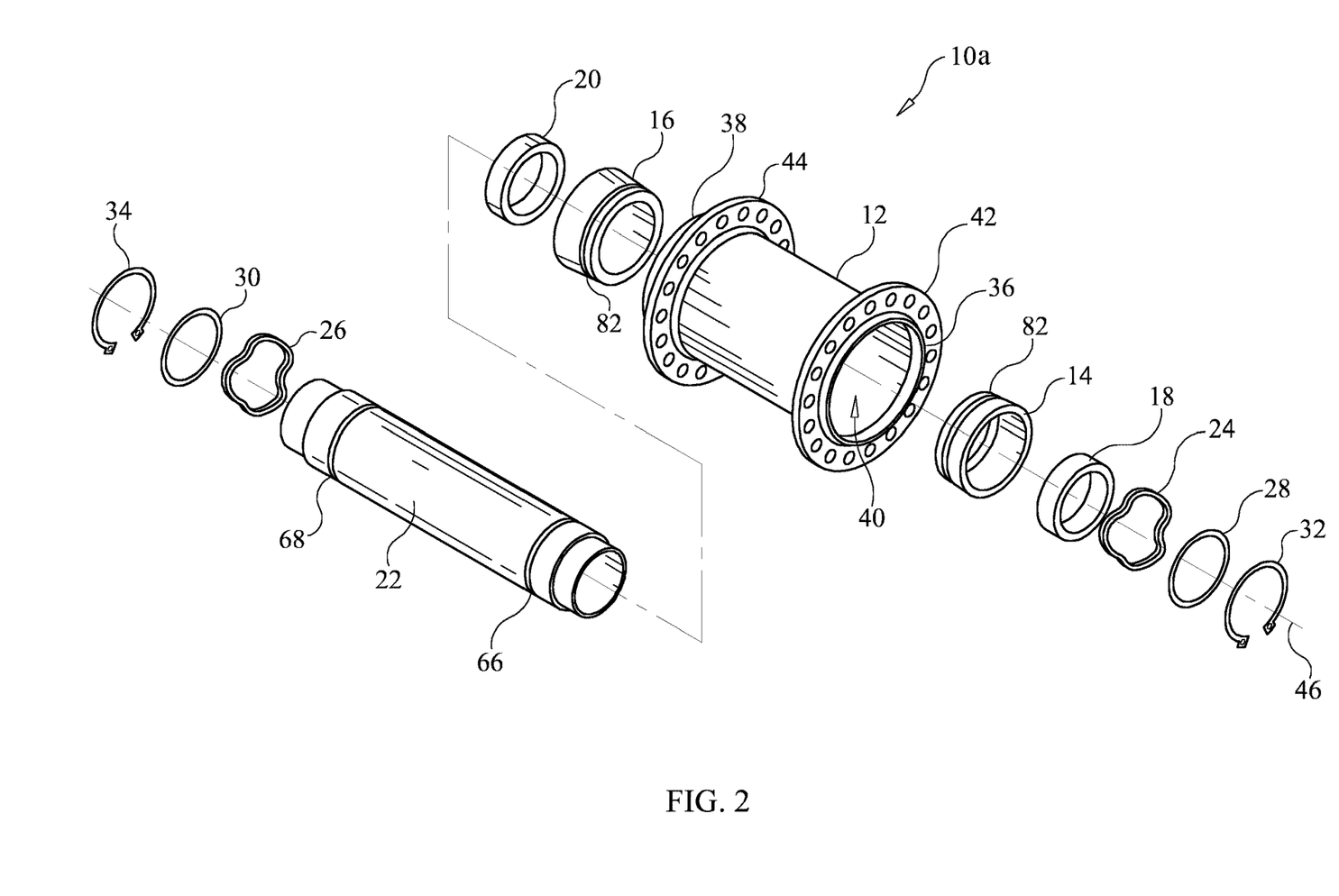
FIG. 2 is a diagrammatic, exploded perspective view of the wheel hub assembly of FIG. 1.
Figure 5:
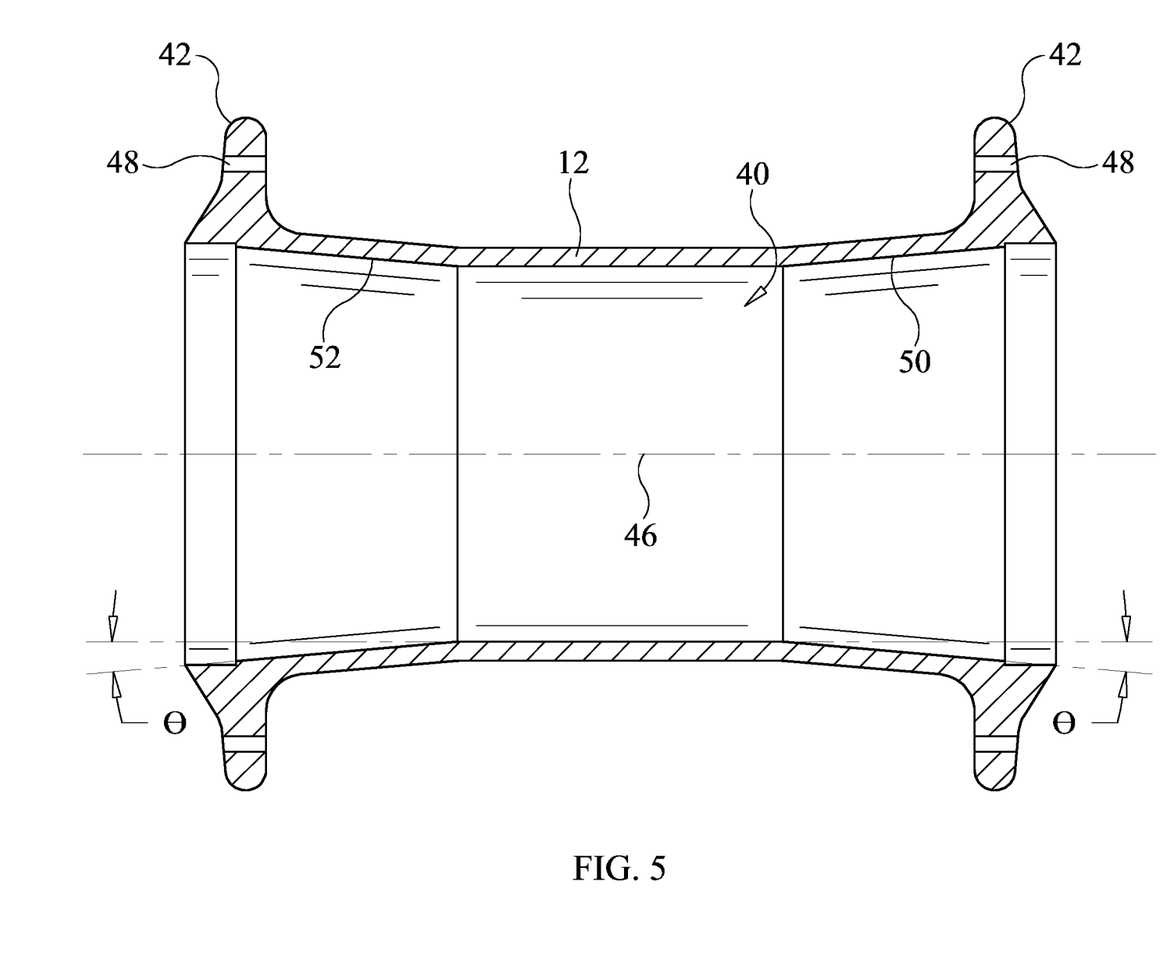
FIG. 5 is a diagrammatic cross-sectional view of a hub shell of the wheel hub assembly of FIG. 1.

Hub shell 12 has opposite ends 36 and 38, a through bore 40 extending through the opposite ends, and flanges 42 and 44. Flanges 42 and 44 extending radially from the axis 46 of the hub shell 12 and have a plurality of holes 48, slots, or other structures which provide for interconnecting the hub shell to a plurality of spokes.

Through bore 40 comprises inwardly tapered sections 50 and 52 located at opposite ends of the through bore, and an intermediate section 54 connecting the tapered sections. The tapered sections 50 and 52 each taper from wide to narrow in an inwardly direction along axis 46. In other words, the through bore 40, at the tapered sections 50 and 52, is wider at an outer location that it is an inner location relative to the respective shell body ends 36 and 38. Preferably, the degree of taper for each tapered section 50 and 52 is not less than about 3 degrees and not more than about 12 degrees with respect to the axis 46. It has been found that a taper of less than about five degrees or more than about ten degrees does not provide the desired movement of the bearing cups 14 and 16, as is explained in more detail below.

Figure 3:
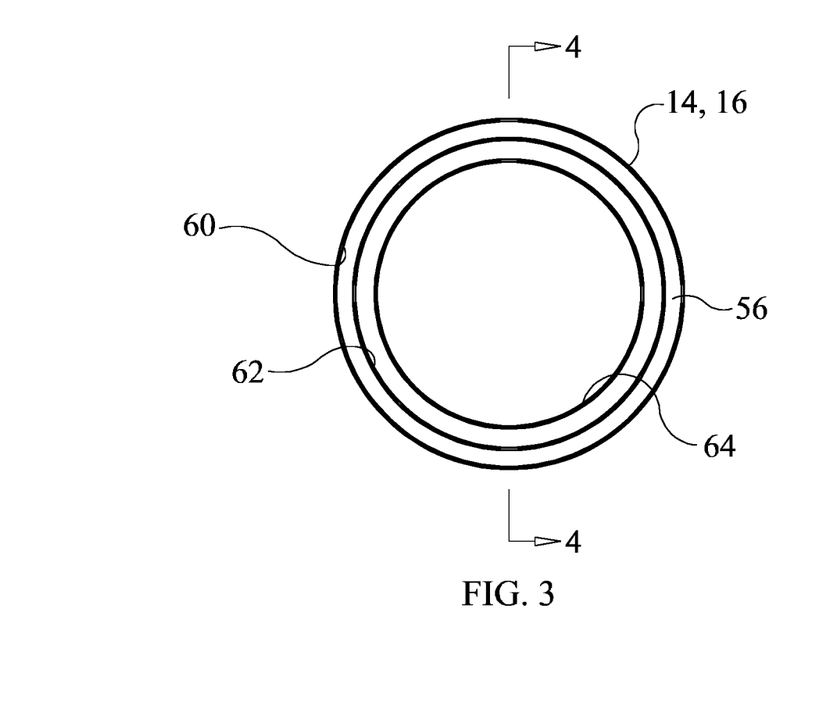
FIG. 3 is a diagrammatic plan view of a bearing cup constructed in accordance with an embodiment of the invention.
Figure 4:
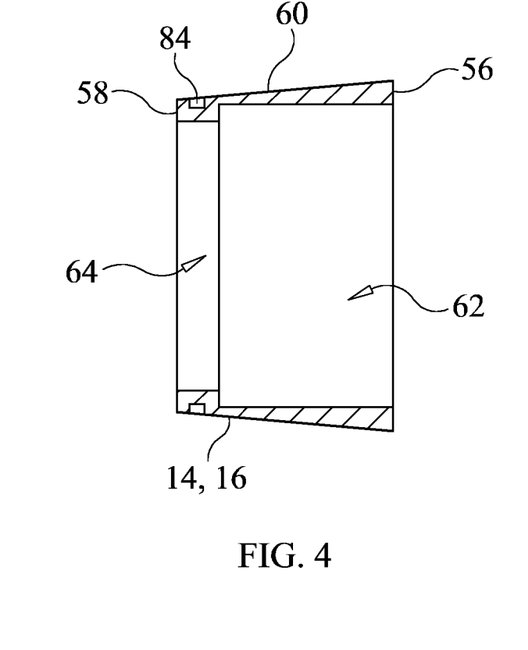
FIG. 4 is a diagrammatic cross-sectional view of the bearing cup of FIG. taken along line 4-4 in FIG. 3.

Each bearing cup 14 and 16 has opposite sides 56 and 58, a frustoconical-shaped body 60 extending between the sides, a bearing seat bore 62 formed through side 56, and an axle bore 64 formed through side 58, which connects to the bearing seat bore to permit an axle to pass completely through the bearing cup. The frustoconical-shaped body 60 tapers from wide to narrow in a direction from side 56 to side 58.

The degree of taper of the frustoconical-shaped body 60 of each bearing cup 14 and 16 is made to correspond to the degree of taper of the tapered sections 50 and 52, respectively, of the through bore 40, such that each bearing cup can be positioned in the respective tapered section with the outer surface of the body in circumferential contact with the wall surface of the respective tapered section. In other words, bearing cup 14 is disposed in through bore 40 along tapered section 50 such that the narrow side 58 is inwardly positioned, the wide side 56 is outwardly positioned, and the outer surface of the frustoconical-shaped body 60 is in contact with the wall of the through bore along a length of the tapered section 50. And similarly, bearing cup 16 is disposed in through bore 40 along tapered section 52 such that the narrow side 58 is inwardly positioned, the wide side 56 is outwardly positioned, and the outer surface of the frustoconical-shaped body 60 is in contact with the wall of the through bore along a length of the tapered section 52.

Bearings 18 and 20 are disposed in bearing seat bore 62 of bearing cups 14 and 16, respectively. With the bearings 18 and 20 received by bearing cups 14 and 16, a bearing assembly is formed such that the bearings are seated within the cups for conjoined movement therewith.

Axle 22 extends along axis 46 through bearings 18 and 20 such that the hub shell 12 is rotatably supported at its opposite ends by the bearings upon axle 22. Preferably bearings 18 and 20 are angular contact bearings such that both axial and radial loads on axle 22 are accommodated.

Wave springs 24 and 26 are disposed on opposite ends of the axle 22 and are retained in place so that the wave springs exert a biasing force against bearings 18 and 20, and their respective bearing cups 14 and 16. The respective biasing forces by wave springs 24 and 26 serve two functions. First, the biasing forces move the respective bearing assemblies inwardly along the axis 46 until the outer surface of the bearing cup contacts the wall of the through bore 40 along the respective tapered section 50 and 52. Second, the biasing forces provide a desire preload on the bearings 18 and 20, which is particularly important for angular contact bearings.

As depicted, wave springs 24 and 26 are retained on axle 22 by respective retaining rings 32 and 34 that are received by grooves 66 and 68 formed on the outer surface of axle 22. As further shown, optional washers 28 and 30 are disposed between the wave springs 24 and 26 and the retaining rings 32 and 34, respectively. Washers 28 and 30 help attaching and removing the retaining rings 32 and 34 by providing a contact surface between the retaining rings and the wave springs 24 and 26. It is contemplated that additional washers could be used between the wave springs and the retaining rings to achieve a desire biasing force by the wave springs.

It is to be understood, however, that retaining rings 32 and 34 could be replaced by threaded nuts or other devices that operate to retain the wave springs 24 and 26 on axle 22 and apply the desired biasing force against the bearing assemblies. However, retaining rings 32 and 34 make the axle construction simpler and assembly and disassembly of the hub assembly 10a easier.

Further, as depicted, axle 22 is shown as a hollow axle having female threaded ends. It is important to understand that axle 22 is not limited to this representatively shown configuration and could have other forms, such as, for example, a solid axle with male or female threaded ends.

Optionally, bearing cups 14 and 16 may have an o-ring 82 encircling around the outer surface of body 60 and disposed within a groove 84. The purpose of o-ring 82 is to provide a slight frictional fit between the bearing cup and the through bore 40 so that during assembly and disassembly the bearing cup does not freely fall out of the bore.

In use, it can be understood an important feature of this construction is that the hub assembly 10a operates to automatically adjust and to account for widening of the through bore 40 at either end of the hub shell 12 caused by over tensioning spokes, for example. Specifically, if the hub shell 12 is deformed at either end 36 or 38 by over tensioning of spokes connected to flanges 42 and 44, respectively, such that the through bore 40 is widened at either tapered section 50 and 52, which are located approximate the flanges 42 and 44, the biasing force against the bearing assembly causes the bearing assembly to move inwardly to maintain bearing cup contact with the wall of the through bore.

Maintaining the contact between the bearing cup and the wall of the through bore is what prevents wheel wobble. The tapered relationship between the bearing cup and the through bore tapered sections permits the bearing cup to move inwardly along the hub shell axis a distance to maintain the needed contact. The biasing force provided by the wave spring causes the bearing cup to automatically move inwardly.

Figure 6:
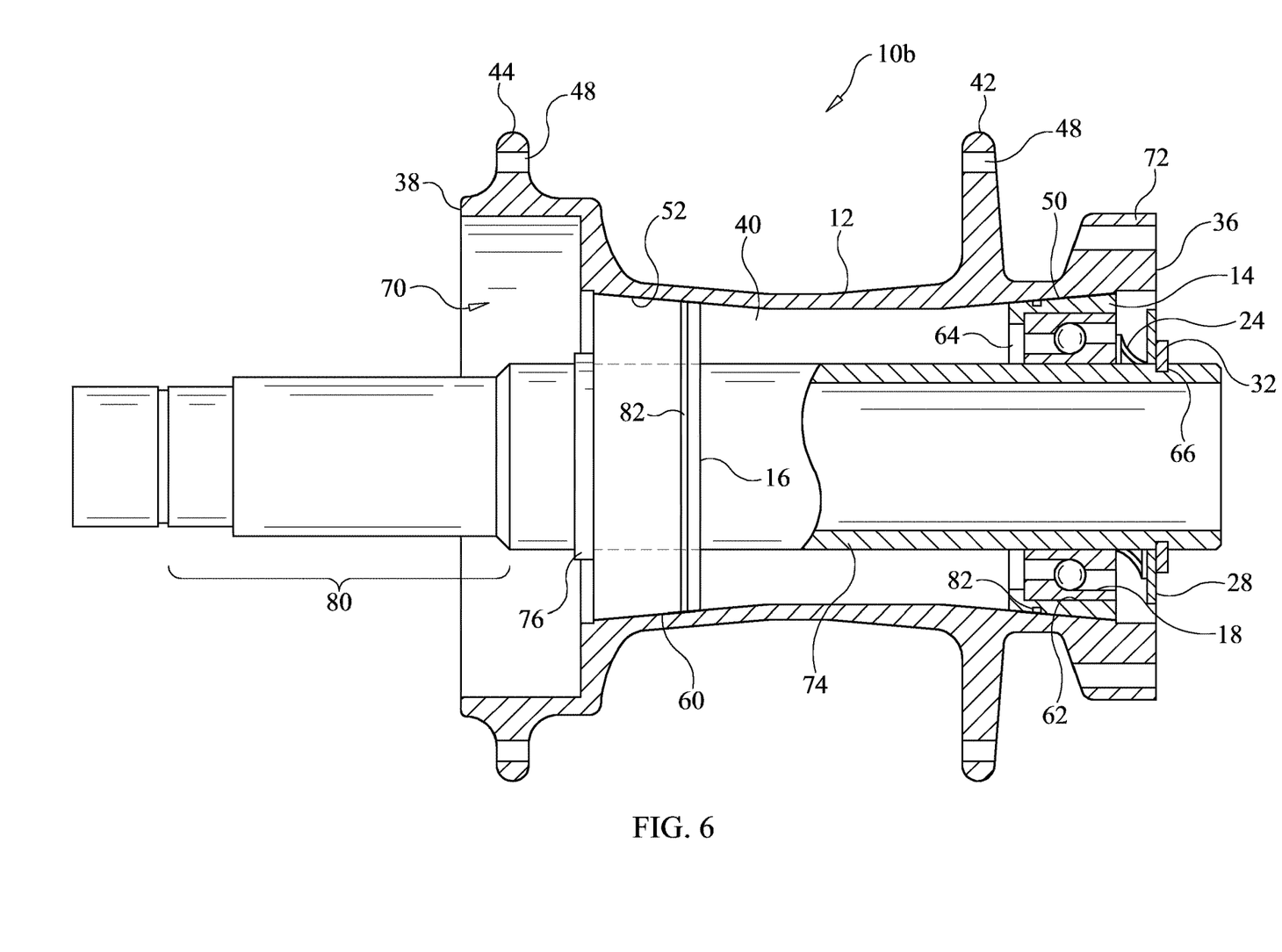
FIG. 6 is a diagrammatic cross-sectional view of a wheel hub assembly constructed in accordance with another embodiment of the invention.
Figure 7:
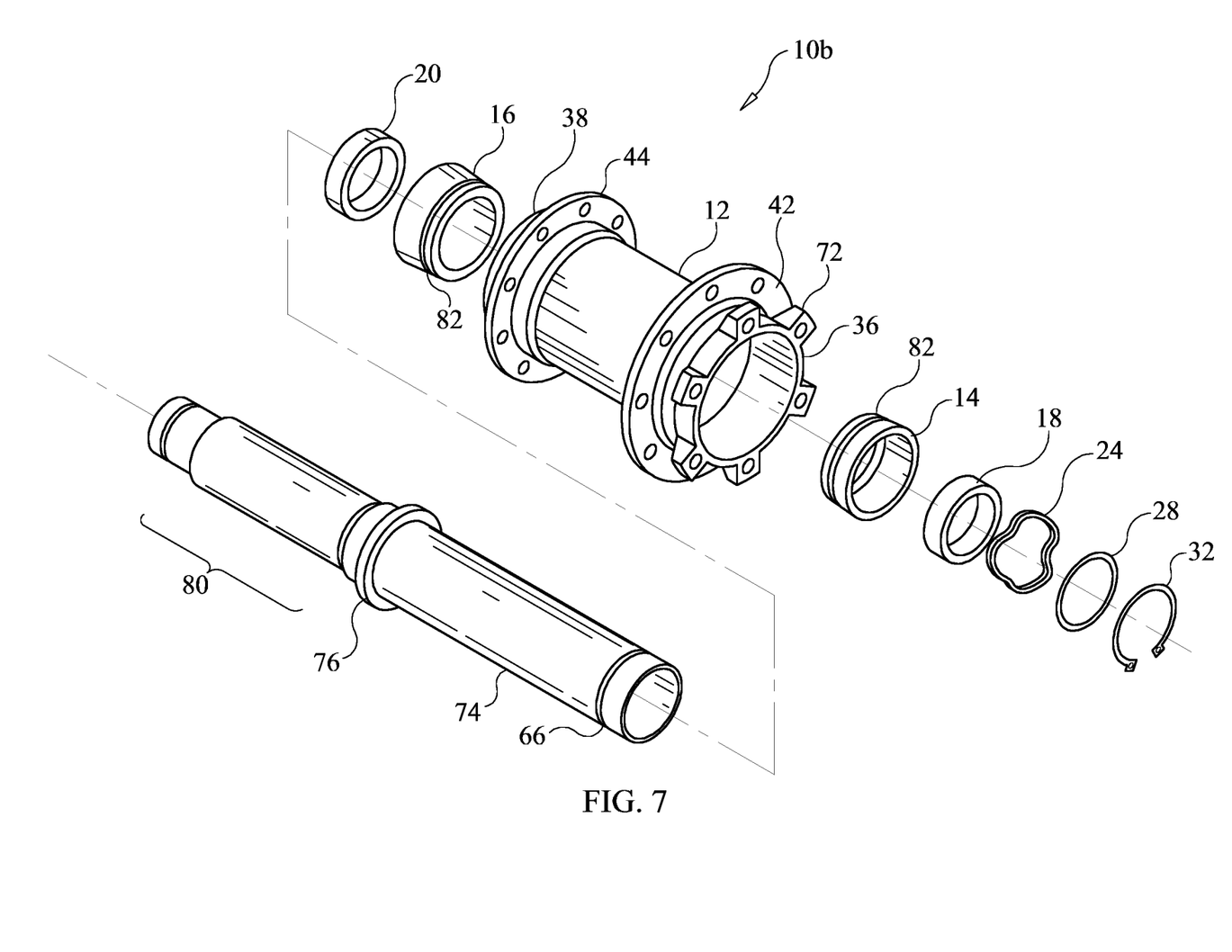
FIG. 7 is a diagrammatic, exploded perspective view of the wheel hub assembly of FIG. 5.

With reference now to FIGS. 5 and 6, there is representatively illustrated a wheel hub assembly 10b according to another embodiment of the invention. Wheel hub assembly 10b is representatively shown as a rear hub assembly for a bicycle wheel. And is shown without a driver and/or cassette assembly, which do not form any part of this invention. The construction of wheel hub assembly 10a and 10b are very similar and like reference numbers refer to the same or similar parts between the assemblies, as such a detailed description of each part is not required to understand the construction and operation of wheel hub assembly 10b.

Wheel hub assembly 10b is different from wheel hub assembly 10a in a few respects. For instance, end 38 of the hub shell 12 is constructed to receive a driver and/or hub cassette (not shown) within bore 70 and the opposite end 36 of the hub shell may include a flange 72 for mounting a disc brake (not shown) to the hub shell. Axle 74 replaces axle 22 of hub assembly 10a. Axle 74 includes a bearing retaining shoulder 76 which replaces retaining ring 34. In this construction, wave spring 24 pushes against bearing 18 and causes shoulder 76 to push against bearing 20 by a pulling force applied to axle 74 by spring 24.

While not shown, wave spring 26 and optionally washer 30 could be disposed on axle 74 between shoulder 76 and bearing 20 which is disposed in bearing cup 16. Additionally, unlike axle 22, axle 74 includes a length 80 located outwardly from shoulder 76 for mounting a driver and/or hub cassette to the axle.

The operation of wheel hub assembly 10b is apparent from its similar construction to hub assembly 10a and the discussion of its operation provided above. Accordingly, a separate explanation of how wheel hub assembly 10b operates is not required here.

Several embodiments of the present invention have been described. Nevertheless, it will be understood that various modifications may be made without departing from the spirit and scope of the invention. Accordingly, other embodiments are within the scope of the following claims.

What is claimed is:

1. A wheel hub assembly comprising:
   a hub shell having opposite first and second ends, a through bore extending through said first and second ends, and first and second flanges extending outward from said hub shell for interconnecting said hub shell to a plurality of spokes;
   said through bore, at opposite ends thereof, being tapered from wide to narrow in an inward direction along said axis of said hub shell;
   first and second bearing cups each having opposite first and second sides, a frustoconical-shaped body extending between said first and second sides, a bearing seat bore formed through said first side, and an axle bore formed through said second side and connecting with said bearing seat bore, said frustoconical-shaped body tapering from wide to narrow in a direction from said first side to said second side, wherein said taper of said frustoconical-shaped body corresponds to said taper of said through bore at one of said opposite ends of said through bore such that said frustoconical-shaped body is disposed within said through bore at the respective end thereof and movable in a direction along said axis;
   a first bearing removably seated within said bearing seat bore of said first bearing cup;
   a second bearing removably seated within said bearing seat bore of said second bearing cup;
   an axle extending along said axis of said hub shell and through and rotatably engaged with said first and second bearings;
   a first wave spring positioned on one end of said axle and being retained in place on said axle such that a biasing force is exerted by said first wave spring upon said first bearing in a direction along said axis of said hub shell; and
   a second wave spring positioned on an end of said axle opposite of said first wave spring and being retained in place on said axle such that a biasing force is exerted by said second wave spring upon said second bearing in a direction along said axis of said hub shell.

2. The wheel hub assembly of claim 1, wherein said taper of said through bore at said opposite ends thereof being about between 3 and 12 degrees relative to said axis of said hub shell.

3. The wheel hub assembly of claim 1, wherein at least one of said first and second bearings is an angular contact bearing.

4. A wheel hub assembly comprising:
   a hub shell having opposite first and second ends, a through bore extending through said first and second ends, and first and second flanges extending outward from said hub shell for interconnecting said hub shell to a plurality of spokes;
   said through bore, at opposite ends thereof, being tapered from wide to narrow in an inward direction along said axis of said hub shell;
   first and second bearing cups each having opposite first and second sides, a frustoconical-shaped body extending between said first and second sides, a bearing seat bore formed through said first side, and an axle bore formed through said second side and connecting with said bearing seat bore, said frustoconical-shaped body tapering from wide to narrow in a direction from said first side to said second side, wherein said taper of said frustoconical-shaped body corresponds to said taper of said through bore at one of said opposite ends of said through bore such that said frustoconical-shaped body is disposed within said through bore at the respective end thereof and movable in a direction along said axis;
   a first bearing removably seated within said bearing seat bore of said first bearing cup;
   a second bearing removably seated within said bearing seat bore of said second bearing cup;
   an axle extending along said axis of said hub shell and through and rotatably engaged with said first and second bearings;
   a wave spring positioned on one end of said axle and being retained in place on said axle such that a biasing force is exerted by said first wave spring upon said first bearing in a direction along said axis of said hub shell; and
   wherein an opposite end of said axle has a bearing engaging shoulder, said bearing engaging shoulder pressing upon said second bearing by said biasing force provided by said wave spring.

5. The wheel hub assembly of claim 4, wherein said taper of said through bore at said opposite ends thereof being about between 3 and 12 degrees relative to said axis of said hub shell.

6. The wheel hub assembly of claim 4, wherein said taper of said through bore at said opposite ends thereof being about between 5 and 10 degrees relative to said axis of said hub shell.

7. A wheel hub assembly comprising:
a hub shell having opposite first and second ends, a through bore extending through said first and second ends, and first and second flanges extending radially from the axis of said hub shell for interconnecting said hub shell to a plurality of spokes;
said through bore, at opposite ends thereof, being tapered from wide to narrow in an inward direction along said axis of said hub shell;
first and second bearing cups each having opposite first and second sides, a frustoconical-shaped body extending between said first and second sides, a bearing seat bore formed through said first side, and an axle bore formed through said second side and connecting with said bearing seat bore, said frustoconical-shaped body tapering from wide to narrow in a direction from side first side to said second side, wherein said taper of said frustoconical-shaped body corresponds to said taper of said through bore at one of said opposite ends of said through bore such that said frustoconical-shaped body is removably seated within said through bore at the respective end thereof;
a first angular contact bearing removably seated within said bearing seat bore of said first bearing cup;
a second angular bearing removably seated within said bearing seat bore of said second bearing cup;
an axle extending along said axis of said hub shell and through and rotatably engaged with said first and second angular contact bearings;
a first wave spring positioned on one end of said axle and being retained in place on said axle such that a biasing force is exerted by said first wave spring upon said first bearing in a direction along said axis of said hub shell; and
a second wave spring positioned on an end of said axle opposite of said first wave spring and being retained in place on said axle such that a biasing force is exerted by said second wave spring upon said second bearing in a direction along said axis of said hub shell.

8. The wheel hub assembly of claim 7, wherein said taper of said through bore at said opposite ends thereof being about between 5 and 10 degrees relative to said axis of said hub shell.

9. The wheel hub assembly of claim 7, wherein said taper of said through bore at said opposite ends thereof being about between 3 and 12 degrees relative to said axis of said hub shell.

10. A wheel hub assembly comprising:
a hub shell having opposite first and second ends, a through bore extending through said first and second ends, and first and second flanges extending radially from the axis of said hub shell for interconnecting said hub shell to a plurality of spokes;
said through bore, at opposite ends thereof, being tapered from wide to narrow in an inward direction along said axis of said hub shell;
first and second bearing cups each having opposite first and second sides, a frustoconical-shaped body extending between said first and second sides, a bearing seat bore formed through said first side, and an axle bore formed through said second side and connecting with said bearing seat bore, said frustoconical-shaped body tapering from wide to narrow in a direction from side first side to said second side, wherein said taper of said frustoconical-shaped body corresponds to said taper of said through bore at one of said opposite ends of said through bore such that said frustoconical-shaped body is removably seated within said through bore at the respective end thereof;
a first angular contact bearing removably seated within said bearing seat bore of said first bearing cup;
a second angular bearing removably seated within said bearing seat bore of said second bearing cup;
an axle extending along said axis of said hub shell and through and rotatably engaged with said first and second angular contact bearings;
a wave spring positioned on one end of said axle and being retained in place on said axle such that a biasing force is exerted by said first wave spring upon said first bearing in a direction along said axis of said hub shell; and
wherein an opposite end of said axle has a bearing engaging shoulder, said bearing engaging shoulder pressing in a direction inwardly upon said second bearing by said biasing force provided by said wave spring.

11. The wheel hub assembly of claim 1, wherein said taper of said through bore at said opposite ends thereof being about between 5 and 10 degrees relative to said axis of said hub shell.

12. The wheel hub assembly of claim 10, wherein said taper of said through bore at said opposite ends thereof being about between 5 and 10 degrees relative to said axis of said hub shell.

13. The wheel hub assembly of claim 10, wherein said taper of said through bore at said opposite ends thereof being about between 3 and 12 degrees relative to said axis of said hub shell.

* * * * *